United States Patent [19]

Mima

[11] 4,192,494

[45] Mar. 11, 1980

[54] CUTTER MAT AND METHOD OF MAKING SAME

[75] Inventor: Rikichi Mima, Ikoma, Japan

[73] Assignee: Miwa Gomu Kogyo Kabushiki Kaisha, Japan

[21] Appl. No.: 867,870

[22] Filed: Jan. 9, 1978

[30] Foreign Application Priority Data

Feb. 9, 1977 [JP] Japan .............................. 52-15410[U]

[51] Int. Cl.² ........................ B32B 7/02; B32B 27/00; B23Q 3/00
[52] U.S. Cl. .............................. 269/289 R; 156/272; 428/141; 428/213; 428/217; 428/520
[58] Field of Search .............. 428/141, 217, 515, 213, 428/215, 218, 520; 156/247, 306, 309, 272, 154, 220; 427/407 R; 248/346, 634; 269/289 R, 308

[56] References Cited

U.S. PATENT DOCUMENTS

| | | | |
|---|---|---|---|
| 1,777,309 | 10/1930 | Hopkinson | 156/309 |
| 2,622,040 | 12/1952 | Harrison, Jr. | 156/247 |
| 3,624,238 | 11/1971 | McKenzie | 428/339 |

*Primary Examiner*—George F. Lesmes
*Assistant Examiner*—P. Thibodeau
*Attorney, Agent, or Firm*—Frank J. Jordan

[57] ABSTRACT

A cutter mat for use as a cushion or support to be laid under a sheet of paper or synthetic resin when the sheet is cut or cut off by a cutter. The mat comprises a base plate of hard synthetic resin, an intermediate layer of semihard synthetic resin and a surface layer of soft synthetic resin which are laminated to each side of the base plate. The surface layer is formed on its surface with projections or indentations to prevent slippage.

4 Claims, 5 Drawing Figures

CUTTER MAT AND METHOD OF MAKING SAME

BACKGROUND OF THE INVENTION

The present invention relates to a cutter mat for use as a pad or support to be laid under a sheet of paper or synthetic resin when the sheet is cut or cut off by a cutter.

Cutter mats of this type heretofore known comprise a base plate of hard synthetic resin such as hard polyvinyl chloride and a surface plate made of relatively soft synthetic resin such as soft polyvinyl chloride and adhered to the upper face of the base plate with an adhesive. Since the known mats are usable only on one surface, they are serviceable for a short period of time and involve such inconvenience that the surface, when stained, must be cleaned before further use. Furthermore, because of the differences between the base plate and surface plate in coefficients of expansion and contraction, the mat is susceptible to warping owing to variations in temperature such as between winter and summer. Such warping of the mat results in difficulties in the cutting operation. Additionally the base plate, which is hard and smooth-surfaces on its rear side, tends to slip on the desk or table during the cutting operation, thus involving the risk that the user will be inadvertently injured on his hands or fingers. Conventional mats have another drawback. Since the base plate has a relatively large thickness so as to withstand the cutting action of the cutter edge, the mat has a high rigidity against bending and is accordingly inconvenient to store or handle. It is further noted that the base plate is repeatedly damaged by the cutter when it penetrates the surface layer, with the result that the rigidity of the mat will be reduced during use and will be eventually broken at a damaged portion. The surface layer might be made thicker and the base plate thinner, but if the surface layer has an increased thickness, the cutter would cut deeper and thereby encounter greater resistance, failing to function efficiently. With incisions formed in the thick surface layer, the rigidity of the mat would be markedly reduced.

SUMMARY OF THE INVENTION

An object of this invention is to provide a mat which is usable on both sides and thereby made serviceable over a prolonged period of time.

Another object of this invention is to provide a mat which restrains the slippage of the workpiece thereon to ensure an efficient cutting operation.

Another object of this invention is to provide a mat which is restrained from slipping on the work table and which thereby permits cutting operation in a stable position.

Another object of this invention is to provide a mat which offers suitable cutting resistance to the cutter for an efficient operation.

Another object of this invention is to provide a mat which is free of warping due to variations in temperature.

Another object of this invention is to provide a mat which is flexible and convenient to use.

Another object of this invention is to provide a mat which is usable while retaining its rigidity.

Another object of this invention is to provide a method of making a rough-surfaced mat which is not susceptible to slippage.

This invention provides a mat which is usable on both sides and which is accordingly rendered convenient to use and serviceable for a prolonged period of time. The mat comprises a base plate, and an intermediate layer and a surface layer superposed on each side of the base plate. This construction prevents the mat from warping when exposed to at varying temperatures and also results in increased flexibility for the mat owing to the fact that a base plate of reduced thickness can be employed. Stated more specifically, the mat of this invention comprises a base plate of hard synthetic resin, and an intermediate layer of semihard synthetic resin and a surface layer of soft synthetic resin which are laminated to each side of the base plate. The surface layer is rough-surfaced to prevent slippage.

The intermediate and surface layers may be laminated to both sides of the base plate with an adhesive. However, the mat can be more easily made by the thermal adhesion method in which the superposed assembly is heated with the simultaneous application of pressure first at one end and progressively toward the other end.

Each of the surface layers is formed on the surface with projections or indentations or is rough-surfaced by being pressed on with a roller having projections or indentations on its surface. Alternatively, the surface layer is rendered rough-surfaced by affixing a woven fabric of fine texture thereto, pressing the assembly into close engagement with the fabric, and peeling the fabric from the surface layer, whereby the pattern of the fabric including its projections or indentations can be reproduced on the surface layer. With the latter method, minute but distinct projections or indentations can be formed with ease, giving resulting in a higher coefficient of friction and an improved slippage restraining effect for the surface layer. The surface layers can be made rough-surfaced simultaneously when the constituent layers are laminated into a mat.

The construction according to this invention in which the intermediate layer and the surface layer are provided on each side of the base plate eliminates the likelihood that the mat will warp when subjected to variations in temperature owing to differences in the coefficients of expansion and contraction between the base plate and the surface layer as experienced with conventional mats. Especially when the intermediate layers as well as the surface layers on the opposite sides of the base plate are made identical in thickness, the warping problem can be completely overcome. Furthermore, because the base plate serving which serves as a rigid member against bending is sandwiched between the opposed pairs of intermediate and surface layers unlike the conventional construction in which the surface layer is positioned on one side and the base plate on the other side, a base plate of reduced thickness may be used thereby resulting in a more flexible mat, and one which is therefore convenient to handle.

The intermediate layer functions to resist the cutting action of the cutter edge, thus restricting the depth to which the cutter penetrates and thereby reducing the resistance which the cutter encounters when cutting the workpiece. The intermediate layer also serves to protect the base plate from damage.

The three-layer construction described is so adapted that the surface layer permits the cutter to cut therein with ease to facilitate the cutting operation, that the base plate imparts rigidity to the mat and that the intermediate layer prevents damage to the base plate. Accordingly the three layers are not particularly limited as to specific absolute values of hardness, insofar as the layers of three different hardnesses are arranged from the surface to the center of the mat so that the above functions can substantially be ensured. When the mat is so constructed, the user will feel an increase in the resistance the cutter encounters when the cutter edge bites into the intermediate layer on penetration through the surface layer. Consequently the cutter edge will not be allowed to penetrate the intermediate layer completely and damage the base plate but enables a cutting operation while being maintained at a suitable depth relative to the mat, namely so as to povide a suitable degree of resistance.

Simulataneously with the formation of projections or indentations, the surface layer may be provided with a checkered pattern, scale or some other suitable design by process printing, or it may be suitably colored. Alternatively the intermediate layer may be colored or formed with a pattern for use in combination with a transparent or semi-transparent surface layer.

BRIEF DESCRIPTION OF THE DRAWINGS

These and other features and advantages of the present invention will become more apparent from the following detailed description with reference to the drawings, in which.

DESCRIPTION OF THE PREFERRED EMBODIMENTS

Figure 1:
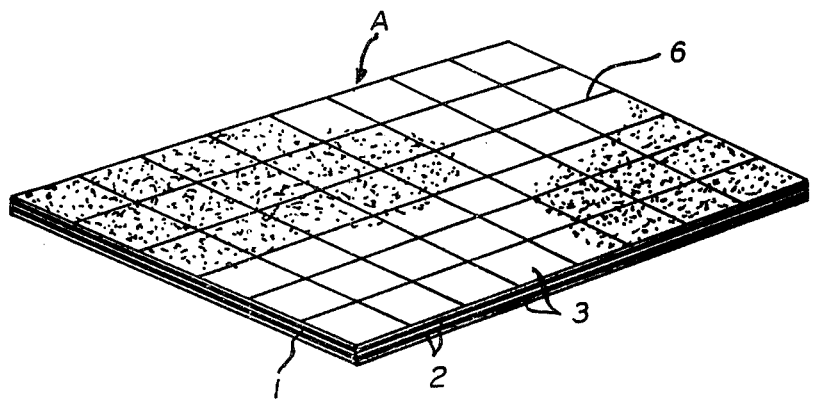
FIG. 1 is a perspective view showing a cutter mat according to one embodiment of this invention.
Figure 2:
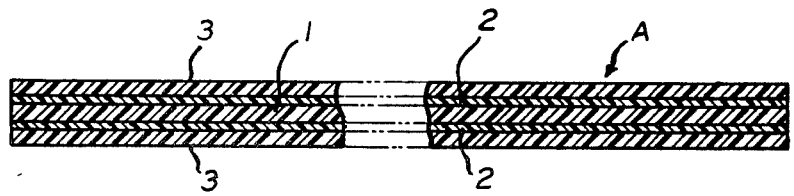
FIG. 2 is an end view in section partly broken away and showing the mat of FIG. 1.

With reference to the drawings, a base plate 1 is made from hard synthetic resin such as hard polyvinyl chloride and is provided in a rectangular shape. An intermediate layer 2 of semihard synthetic resin such as semihard polyvinyl chloride and a surface layer 3 of soft synthetic resin such as soft polyvinyl chloride are laminated to each side of the base plate 1 by thermal adhesion, whereby a cutter mat A of five-layer construction is formed. The intermediate layers 2 as well as the surface layers 3, which are arranged symmetrically with respect to the base plate 1, are identical in thickness, so that the front and rear sides of the base plate 1 are exactly symmetrical with respect to the base plate 1 in both construction and thickness. Thus the mat A is similarly usable on both its front and rear sides, while the front and rear sides of the base plate 1 are identical in coefficients of expansion and contraction to thereby eliminate the warping of the mat due to variations in temperature. The intermediate layer 2 of semihard material interposed between the hard base plate 1 and each soft surface layer 3 substantially adds to the overall strength of the mat, making it possible to reduce the thickness of the base plate 1 by a corresponding amount, whereby the mat can be made flexible in its entirety as stated earlier. In other words, even when the hard base plate 1 has a reduced thickness, the resulting reduction in strength can be fully compensated for by the semihard intermediate layers 2. Accordingly, the mat of this invention, although having nearly the same overall thickness as conventional mats, is more flexible and yet has a higher strength.

In the fabrication of cutter mat A as decribed, elongated synthetic resin sheets are used as materials for the base plate 1, and intermediate layer 2 and surface layer 3. The base plate 1, intermediate layers 2 and surface layers 3 are superposed in the specified arrangement, and are thermally adhered to one another by heating with the application of pressure. Such thermal adhesion for the lamination of the five layers eliminates the need for application of an adhesive and is suitable for quantity production at low cost, hence such a method is advantageous. However, the layers can alternatively be laminated with the use of an adhesive or by some other means, whereby the objects of this invention are similarly attainable. Usually the surface layers 3 may be made of a soft resin sheet colored, for example, in green to give an attractive appearance to the mat. The semihard layers 2 intermediate and the base plate 1 need not always be colored. Further the surface layers 3 may be colored differently to provide a more attractive mat. This also serves to identify each face of the mat, thereby ensuring convenience in using the two faces with equal frequency.

Figure 3A:
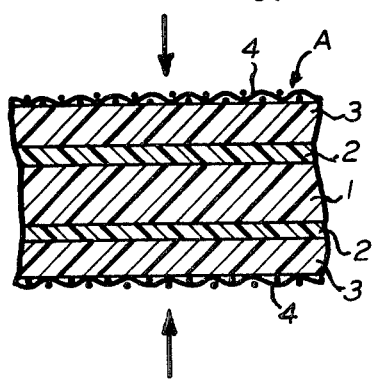
FIGS. 3 (a) and (b) are fragmentary enlarged views in section showing the respective steps in a process for forming projections or indentations on the surface layers of the mat according to this invention.
Figure 3B:
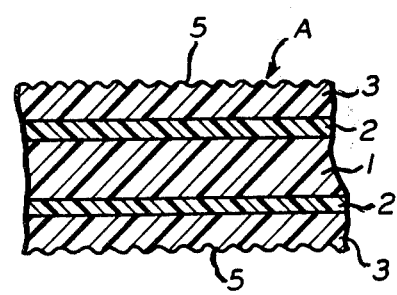

The surface layers 3 are rough-surfaced or formed on their surfaces with projections or indentations to restrain the slippage of paper or like work sheet on the mat. The slippage preventing projections or indentations may be formed by pressing or calendering the surface layer with a rough-surfaced roller as in the prior art. However, the mat A may be formed with fine projections or indentations with the use of a woven fabric. In the mat making process, sheets of fabric 4 of fine texture such as twill fabric are placed over the surfaces of the surface layers 3 as shown in FIG. 3 (a), the superposed layers are then pressed in the directions of the arrows and heat is applied over the fabric 4. The fabric 4 is thereafter peeled off, whereby the woven pattern 5 of the fabric 4, including its minute projections or indentations, are formed on the surface of the layers 3 as shown in FIG. 3 (b), simultaneously with the thermal adhesion of the layers. As compared with the conventional method in which the surface layer is made rough-surfaced by the use of a roller having a rough surface, more minute and distinct projections or indentations arranged more closely can be formed on the surface layers 3, giving a higher coefficient of friction, and an improved slippage preventing effect imparted to the surfaces of the layers 3. Moreover, the method, which forms rough surfaces with the use of fabric simultaneously with the formation of the mat, is suitable for quantity production because of the reduced number of steps.

When desired, the surfaces of the surface layers 3 having the projections or indentations 5 may be provided with a checkered pattern 6, scale or with some other suitable design formed by process printing.

Figure 4:
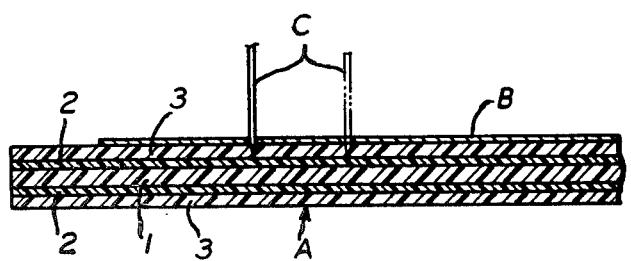
FIG. 4 is an end view in section showing the mat while a cutter is cutting a workpiece positioned on the mat.

When the cutter mat A of the foregoing construction is to be used, a sheet B of paper or synthetic resin is placed on the mat and is then cut by a knife C as shown in FIG. 4. Needless to say, either the front or rear face of the mat A is usable. Although the edge of the knife C penetrating the sheet B will bite into the surface layer 3, the knife C merely leaves a cut line in the layer 3 when removed from the mat, because the layer 3 restores itself where it is cut and closes the cut portion. The cut line will not cause any dificulty in the subsequent cutting operation; a smooth cutting operation is assured at all times. Further when the cutting force is relatively great, the edge of the knife C penetrates and completely cuts the surface layer 3, but the trace of the knife C will be immediately closed by the restoring property of the surface layer 3. The layer 3 which is completely united with the intermediate layer 2 by heat adhesion will not be torn apart at the cut portion.

Inadvertently, a great cutting force may be exerted on the mat. Even in such a case, the edge of the knife C is unlikely to cut the base plate 1 which is the support for the entire mat, because the intermediate layer 2 of semihard synthetic resin is interposed between the surface layer 3 and the base plate 1. The mat therefore retains its strength which would otherwise be impaired if the base plate 1 were to be cut. The semihard material forming the intermediate layer 2 hinders the cutting of the knife edge therein to a much greater extent than does the layer 3, thus reducing the depth of cut in the overall mat and permitting the knife to cut smoothly with reduced resistance.

The mat could be made to withstand a great cutting force by using a base plate 1 of increased thickness in place of the intermediate layer 2. The base plate of greater thickness, however, would impart increased inflexibility to the entire mat as in conventional products already described, rendering the mat inconvenient to handle. Moreover when such a thick base plate is frequently cut, the overall strength of the mat is reduced at an accelerated rate. Conversely, if one were to form the intermediate layer 2 from soft resin like the surface layer 3 so as to provide a soft layer of increased thickness the mat would then have insufficient strength, with a further disadvantage in that the soft layer would be completely cut every time it is subjected to a great cutting force, thereby resulting in a still lower strength. The increase in the thickness of the soft layer would also impart correspondingly increased resistance to the knife, which would then be unable to cut smoothly.

The semihard intermediate layer 2 provided between the hard base layer 1 and each soft surface layer 3 imparts flexibility and high strength to the mat A, and minimizes the reduction in the strength of the mat due to use, ensuring a greatly extended effective life.

The slippage of the work sheet B on the mat A during the cutting operation can be effectively prevented partly because the soft material per se of the surface layer 3 supporting the sheet inherently has a high coefficient of friction and partly because the layer 3 is formed with minute projections or indentations for the prevention of such slippage. With the mat A of this invention, the other surface layer 3 which comes into intimate contact with the work table during the cutting operation also prevents the slippage of the mat A on the work table. This eliminates the likelihood that the hands or fingers of the user will inadvertently be injured as might occur if the sheet B or mat A should slip, thereby ensuring high safety.

As described above, the cutter mat of this invention comprises a base plate of hard synthetic resin, intermediate layers of semihard synthetic resin and surface layers of soft synthetic resin provided symmetrically on the front and rear sides of the base plate, the surface layers being formed on their surfaces with projections or indentations for the prevention of slippage. This construction makes the mat usable on both sides and affords twice the effective life of the conventional mats which can be used on only one side. The mat is therefore economically very advantageous. The identical construction provided on both front and rear sides of the mat prevents warping of the mat due to variations in temperature as well as slippage of the mat on the work table. Additionally, the mat is flexible in its entirety, is convenient to store and handle, yet has sufficient strength the reduction of which is minimized during use and therefore possesses improved durability. Thus the mat of this invention is very valuable for practical use.

What is claimed is:

1. A cutter mat for use as a support upon which sheet material such as a sheet of paper or plastic to be cut is placed on either side, comprising a base plate of synthetic resin, two intermediate layers of synthetic resin each laminated to one side of said base plate, and two surface layers of synthetic resin each laminated to one of said intermediate layers to thereby provide a five-ply laminated mat, each of said intermediate layers being of the same thickness and having the same coefficient of expansion and contraction, each of said surface layers being of the same thickness and having the same coefficient expansion and contraction, such that both sides of the mat on opposite sides of the base plate are symmetrical with respect to the base plate and have the same coefficients of expansion and contraction to thereby preclude warping of the mat due to temperature variations, said surface layers having a softness and restoring property such that a cutting knife will penetrate into said surface layer along a cut line which closes and restores itself upon withdrawal of the knife, said intermediate layers being harder than said surface layers to provide increased resistance to further penetration of the knife into the mat without impairing the cutting operation and at the same time protecting the base plate from penetration by said knife, said base plate being harder than said intermediate layers to thereby provide rigidity to the cutting mat while the softer surface and intermediate layers provide flexibility to the mat, said surface layers each having on their outer surface a woven patten of projections and indentations corresponding to that of a woven fabric and obtained by peeling a woven fabric from said outer surfaces subsequent to heating and pressing thereof, whereby the woven pattern of projections and indentations provides a fine roughened surface to prevent slipping of the mat and without impairing the functioning of the surface layers to stably support the sheet material during the cutting operation.

2. A cutter mat according to claim 1, wherein said synthetic resin for each of the base plate, intermediate and outer surface layers is polyvinyl chloride.

3. A cutter mat according to claim 1, wherein said base plate, intermediate and outer surface layers are laminated by thermal adhesion.

4. A cutter mat according to claim 1, wherein said base plate, intermediate and outer surface layers are laminated by means of an adhesive.

* * * * *